UNITED STATES PATENT OFFICE.

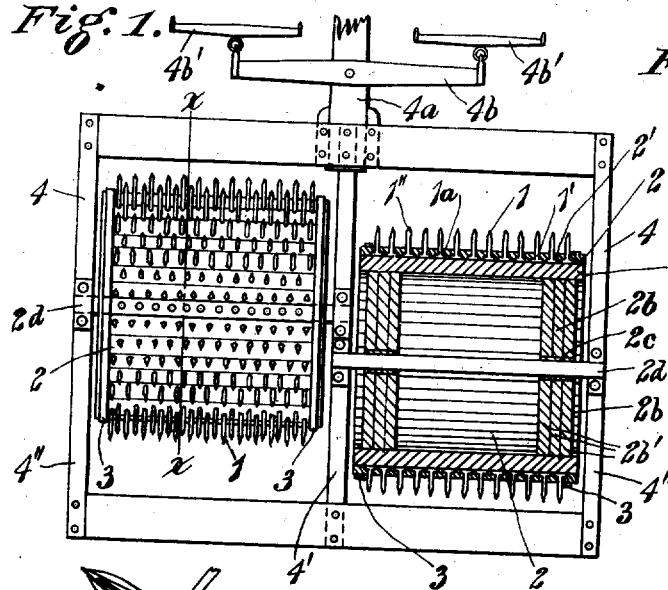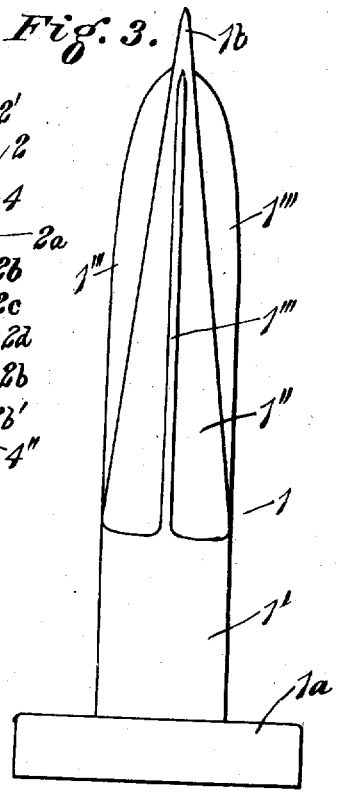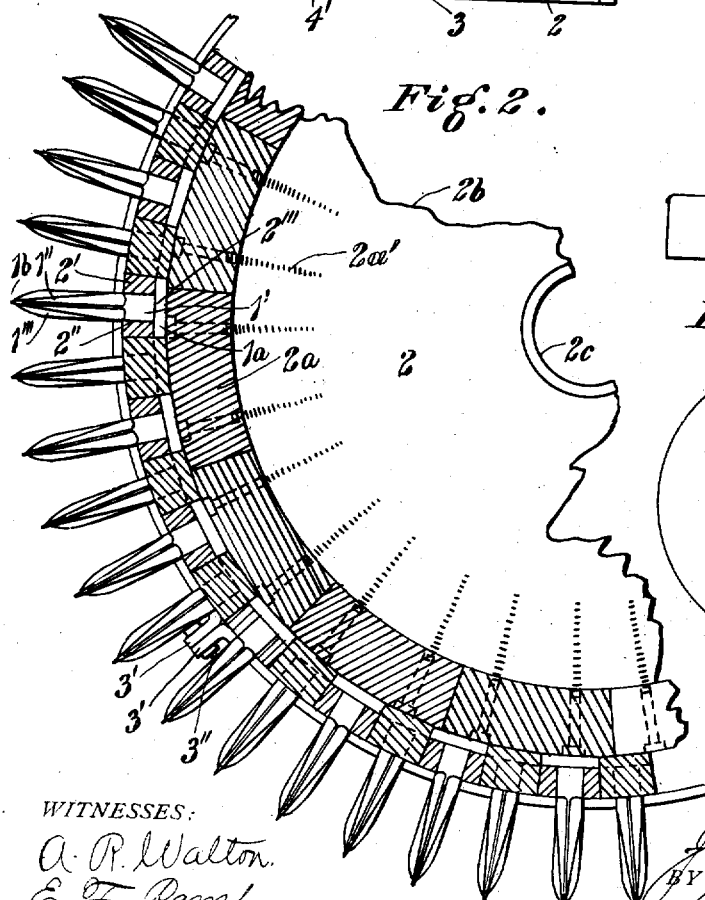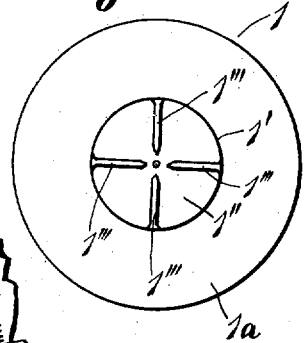

JOSEPH T. CUNNINGHAM, OF CINCINNATI, OHIO.

ROTARY HARROW.

976,439.

Specification of Letters Patent. Patented Nov. 22, 1910.

Application filed June 17, 1910. Serial No. 567,423.

*To all whom it may concern:*

Be it known that I, JOSEPH T. CUNNINGHAM, a citizen of the United States, residing at Cincinnati, in the county of Hamilton and State of Ohio, have invented certain new and useful Improvements in Rotary Harrows, of which the following is a specification.

My invention relates to agricultural implements and the object is to provide a rotary harrow of improved construction and of increased efficiency in operation.

My invention consists in the combination in a rotary harrow of teeth of peculiar formation and of means for securing said teeth on said harrow permitting them to be conveniently removed therefrom and replaced thereon, as well as in the details of construction and arrangement as will hereinafter be more fully described and claimed.

In the drawing: Figure 1 is a sectional plan view of a device embodying my invention. Fig. 2 is a partial cross section of one of the rollers on a line corresponding with the line $x$—$x$ in Fig. 1. Fig. 3 is a side elevation of the tooth and Fig. 4 is a plan view of same.

The essential feature of my improvement is the provision of teeth with cutting edges that will engage with and break up the clods as they successively come down to the ground when carried around on the roller and which will with equal efficiency harrow or break up the ground as the teeth enter the ground when the roller is rolled over the ground.

The tooth 1 which I provide for operating in the above-described manner comprises a straight cylindrical portion 1' adjacent to a head 1$^a$, and a longer tapering or conical portion 1'' occupied by radially extending longitudinal blades or fins 1'''. These blades or fins 1''' have their outwardly extending edges sharp and these edges extend substantially parallel with the axis of the tooth from the junction of the conical part 1'' with the cylindrical part 1' to about half the length of the conical portion and then these edges gradually curve inward toward the conical portion of the tooth and meet therewith and terminate said blades or fins a sufficient distance short of the end or apex of the conical portion 1'' to allow the region 1$^b$ of the conical portion 1'' adjacent to the apex thereof to constitute a point that operates to disintegrate the particles of earth under the surface after the blades or fins 1''' have performed their cutting operation on the particles on the surface.

At no place do the blades or fins 1''' extend past the limits of the cylindrical portion 1'. The teeth 1 thus formed are adapted for convenient application to and removal from the cylinder or roller 2 by mounting said teeth in staves 2', the teeth being placed through openings 2'' in the staves and the heads 1$^a$ of the teeth being received by mortises 2''' in the staves so that the outer surfaces of the heads lie flush with the inner surfaces of the staves. The straight cylindrical portion 1' of each tooth is substantially of the length to bring the junction of the conical portion therewith even with the surface of the stave where the tooth extends through, and it is to thus form a firm bearing in the opening 2'' in the stave that this straight cylindrical portion 1' is provided, the entire operating length of the tooth being constituted by the conical portion 1'' with its blades or fins 1''' and its pointed end part 1$^b$.

The staves 2'' with the teeth 1 mounted therein are placed on the cylinder 2 with the surfaces of the heads thereagainst, and these staves being made to fit with sufficient accuracy and covering the entire convex surface of the cylinder 2, clamping bands 3 are placed around the staves near their ends and the end parts 3' of the clamping bands, which are bent upward for this purpose, are drawn together by a bolt 3''. This rigidly secures the entire series of staves with all of the teeth therein to the cylinder 2. The cylinder 2 is made up of a series of staves or beams 2$^a$ rigidly and permanently secured to ends 2$^b$, preferably by means of lag screws 2$^{a'}$, as illustrated. Each of the ends 2$^b$ is made up preferably of three thicknesses 2$^{b'}$ permanently secured together, and, thus arranged can be constructed of wood, the different thicknesses being placed together with the grain of the wood running in different directions, thus reinforcing each other and providing a structure of sufficient strength to withstand the strains imposed in operation. The ends 2$^b$ thus made up are of sufficient thickness to afford a bearing 2$^c$ by means of which the cylinder 2 may rotate on a shaft 2$^d$ which is mounted in stationary position on a frame 4 which is provided with a pole 4$^a$ and a doubletree 4$^b$ and swingletrees 4$^{b'}$ by means of which the machine may be drawn over the ground.

As indicated in Fig. 1 two cylinders or rollers 2 are provided with complete sets of teeth and staves, in which the teeth are mounted, and clamping bands to hold the staves on the cylinders. Thus arranged, the frame 4 is constructed with a middle forwardly and rearwardly extending beam 4' and side beams 4". The shafts 2ᵈ of both rollers are rigidly secured to these beams 4' and 4", as shown, and as I prefer to arrange the rollers, one of them is mounted with its axial line forward of that of the other. This arrangement adds stability to the machine and reduces the strain on the parts, as well as affords a greater degree of support to the pole 4ª, reducing the burden on the animals which draw the machine.

It will be seen that the teeth 1 with their radial projecting blades or fins having sharp edges presented will perform their cutting operation upon descending onto the ground as the roller proceeds without particular attention to their position as placed on the machine, as is the case with a blade presenting a single knife edge, and at the same time the pointed end part of the tooth may operate upon descending into the ground without interference from the series of knife edges presented by the teeth. While thus presenting the series of knife edges, these edges being confined within the limits of the circumferences of the tooth allows it to be slid through the openings in the staves which are of such conformity to the straight cylindrical part of the tooth that the tooth is held rigidly with respect to sidewise displacement, and the tooth may be inserted and removed from the stave with the greatest convenience. The head 1ª of the tooth affords a widespread and firm bearing against the surface of the cylinder 2 around which the staves are clamped. While a structure is thus afforded with all the strength of a permanent structure the removal of any of the teeth may be accomplished with the greatest of convenience by merely loosening the clamping bands and sliding the staves endwise, lifting them from the cylinder 2 and withdrawing and replacing such teeth as may be required to be replaced through breakage or for other reasons. Likewise any number of teeth may be used in the machine as desired. As shown, the teeth of each row are arranged in alinement with the spaces between teeth in the adjacent rows, as is best adapted to avoid clogging of the machine in use.

Having fully described my invention what I claim as new and desire to secure by Letters Patent is:

1. In a rotary harrow, a cylinder armed with teeth, each tooth comprising a straight cylindrical portion with a broad head adjacent thereto forming one end of the tooth and a tapering or conical portion forming a junction with said cylindrical portion and extending to and constituting an apex forming the other end of the tooth, and radially extending blades or fins lying longitudinally of said conical portion reaching from the junction of said conical portion with said cylindrical portion and terminating short of the apex of the conical portion, whereby the part of the conical portion adjacent to the apex forms a point, substantially as and for the purposes set forth.

2. In a rotary harrow, a cylinder armed with teeth, each tooth comprising a straight cylindrical portion with a broad head adjacent thereto forming one end of the tooth and a tapering or conical portion forming a junction with said cylindrical portion and extending to and constituting an apex forming the other end of the tooth, and radially extending blades or fins lying longitudinally of said conical portion reaching from the junction of said conical portion with said cylindrical portion and terminating short of the apex of the conical portion, whereby the part of the conical portion adjacent to the apex forms a point, said blades or fins having edges outwardly presented and approaching the conical portion as they extend toward the apex thereof, and said edges being confined within the limits of said cylindrical portion, substantially as and for the purposes set forth.

3. In a rotary harrow the combination with a cylinder, of a series of staves and means for removably securing said staves on the convex surface of the cylinder, and a series of teeth removably secured in said staves, the staves having openings through which the teeth are inserted to extend radially outward on the cylinder, heads on the teeth to rest against the convex surface of the cylinder, said staves having mortises to receive the heads, said teeth comprising conical portions and fins or blades on said conical portions, said fins or blades being adapted to pass through the openings in said staves when the teeth are inserted therein.

In testimony whereof I affix my signature in presence of two witnesses.

JOSEPH T. CUNNINGHAM.

Witnesses:
 CHAS. W. KARR,
 CLARENCE PERDEW.